Feb. 12, 1957  J. BOYCE ET AL  2,780,927
CARTON FREEZING APPARATUS
Filed Aug. 8, 1952  9 Sheets-Sheet 1
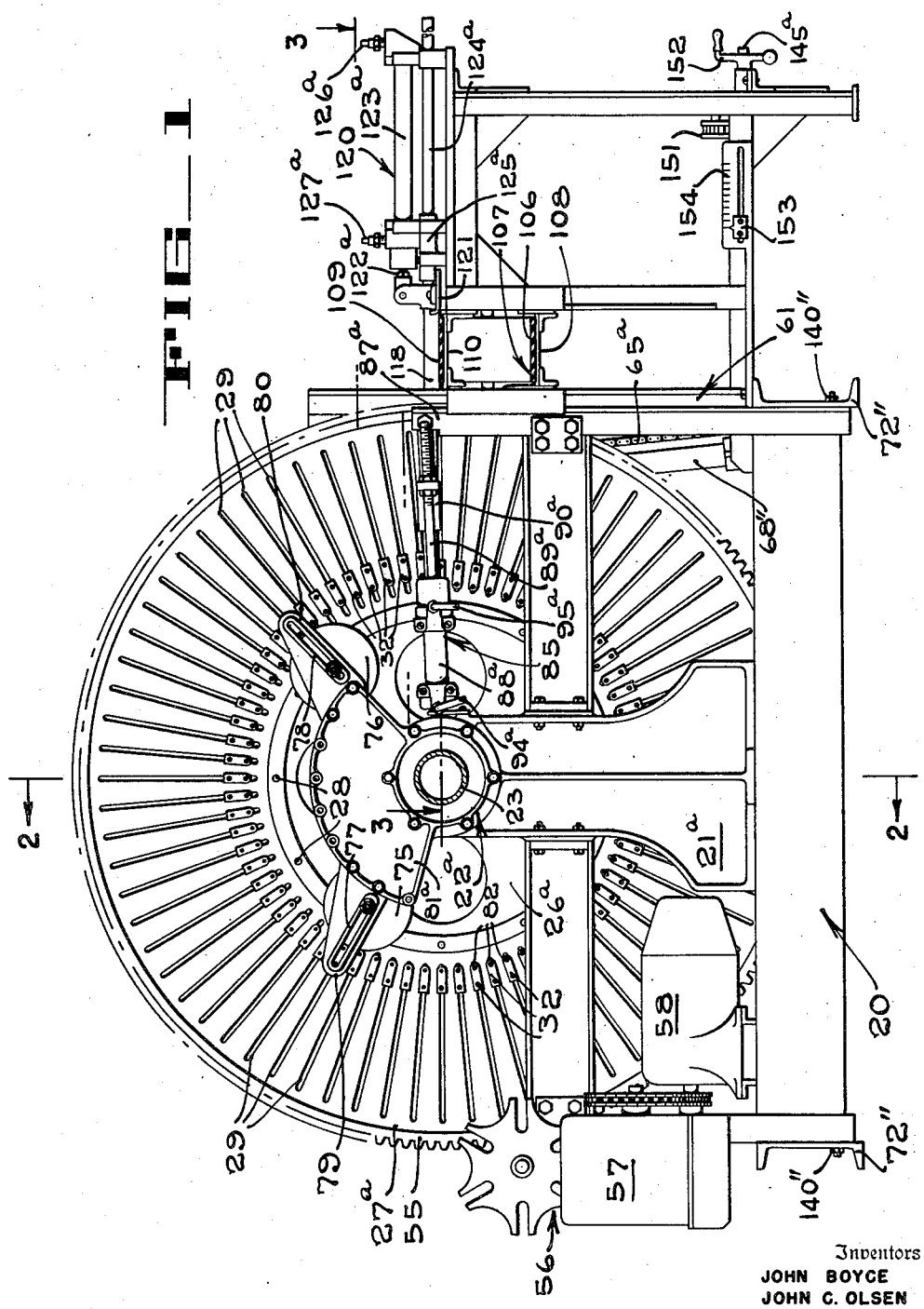
Inventors
JOHN BOYCE
JOHN C. OLSEN
By Hans G. Hoffmeister
Attorney

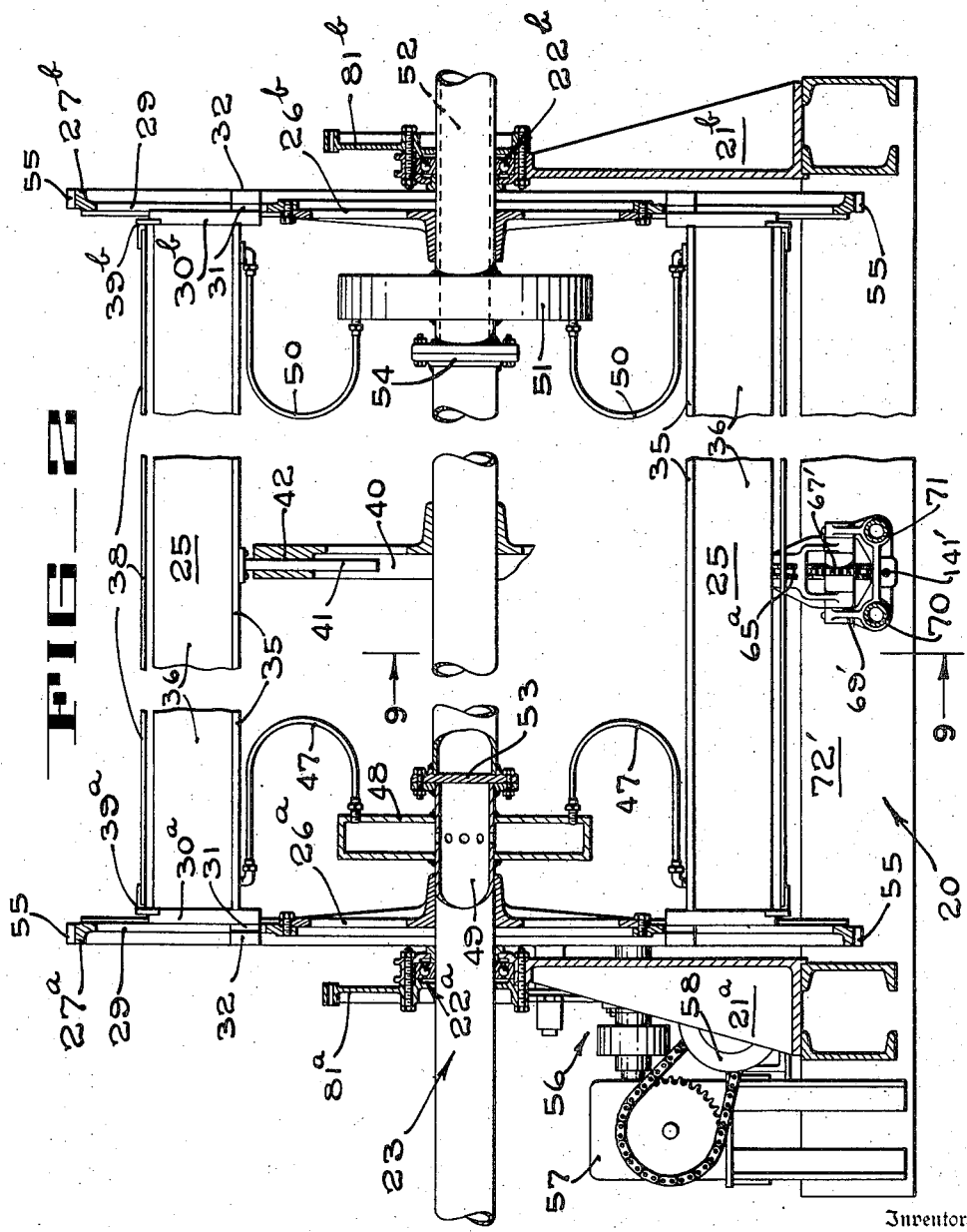

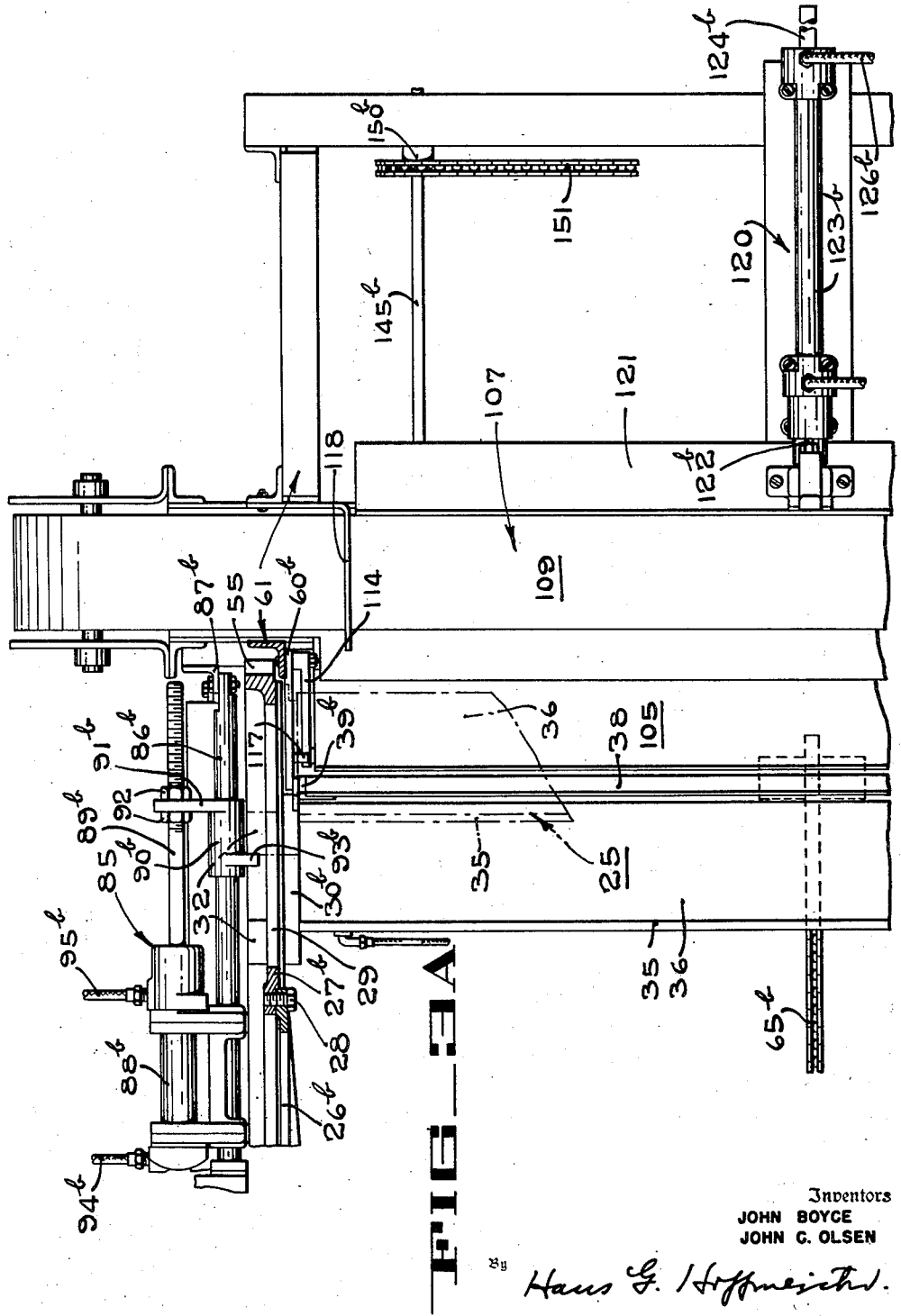

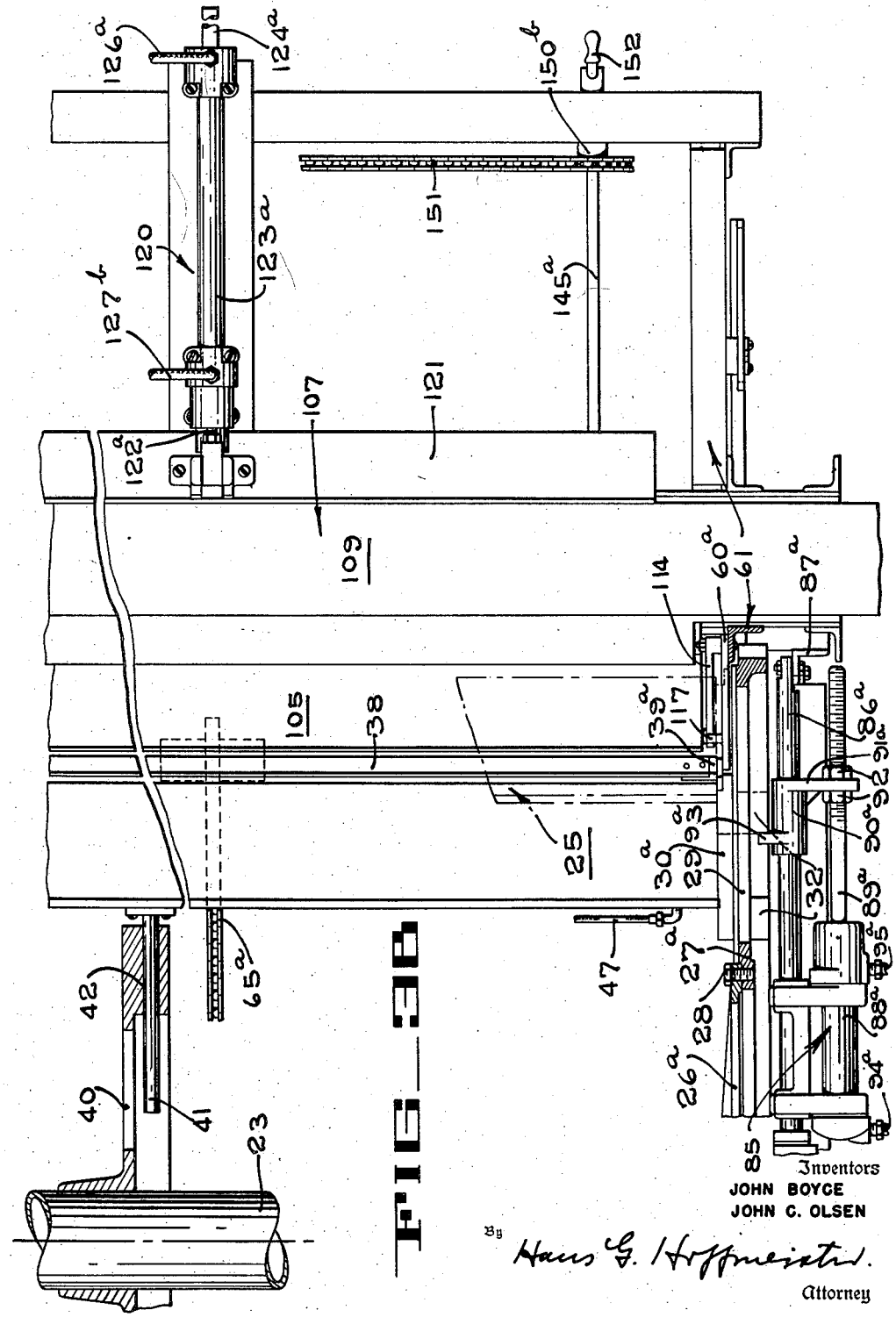

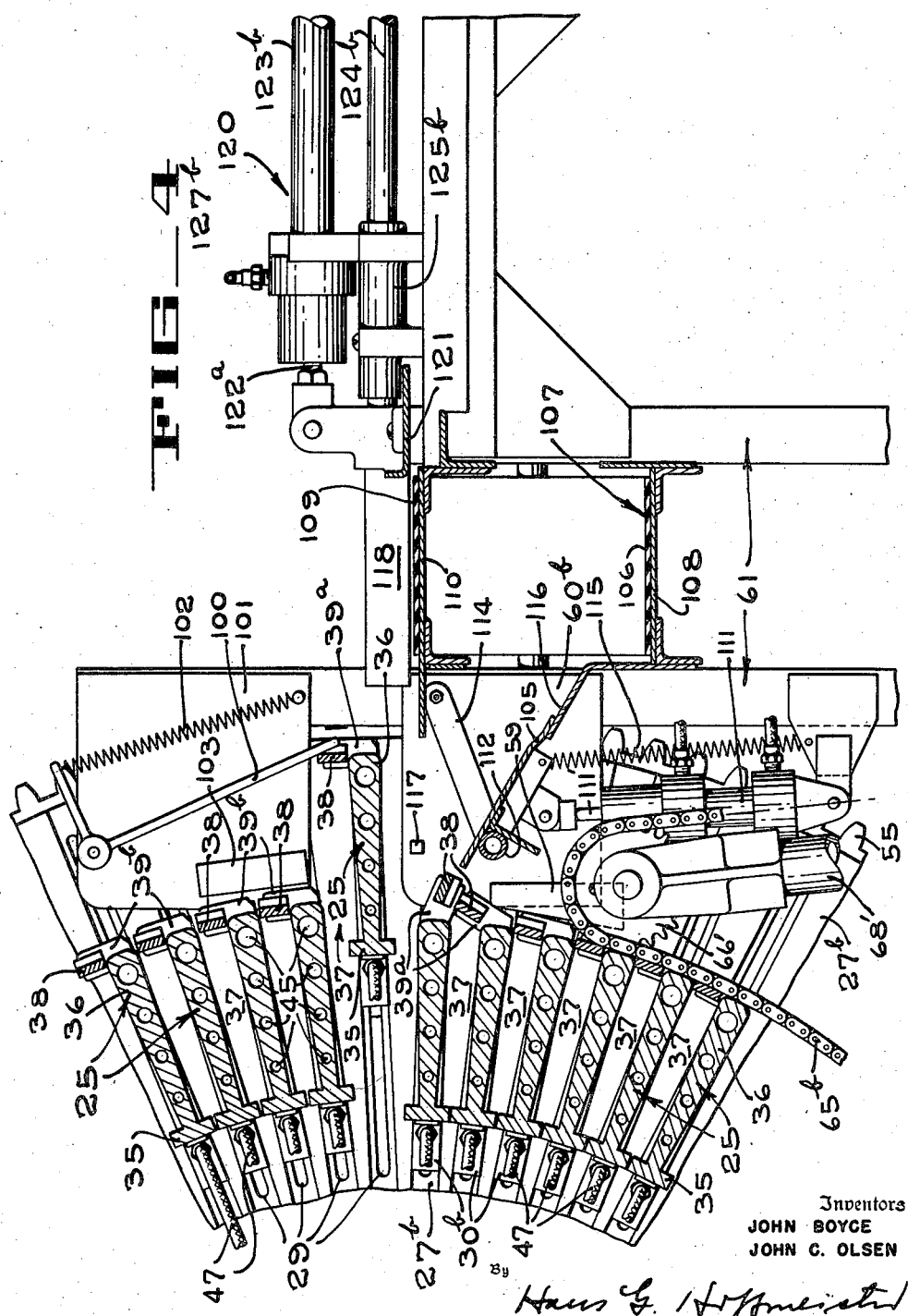

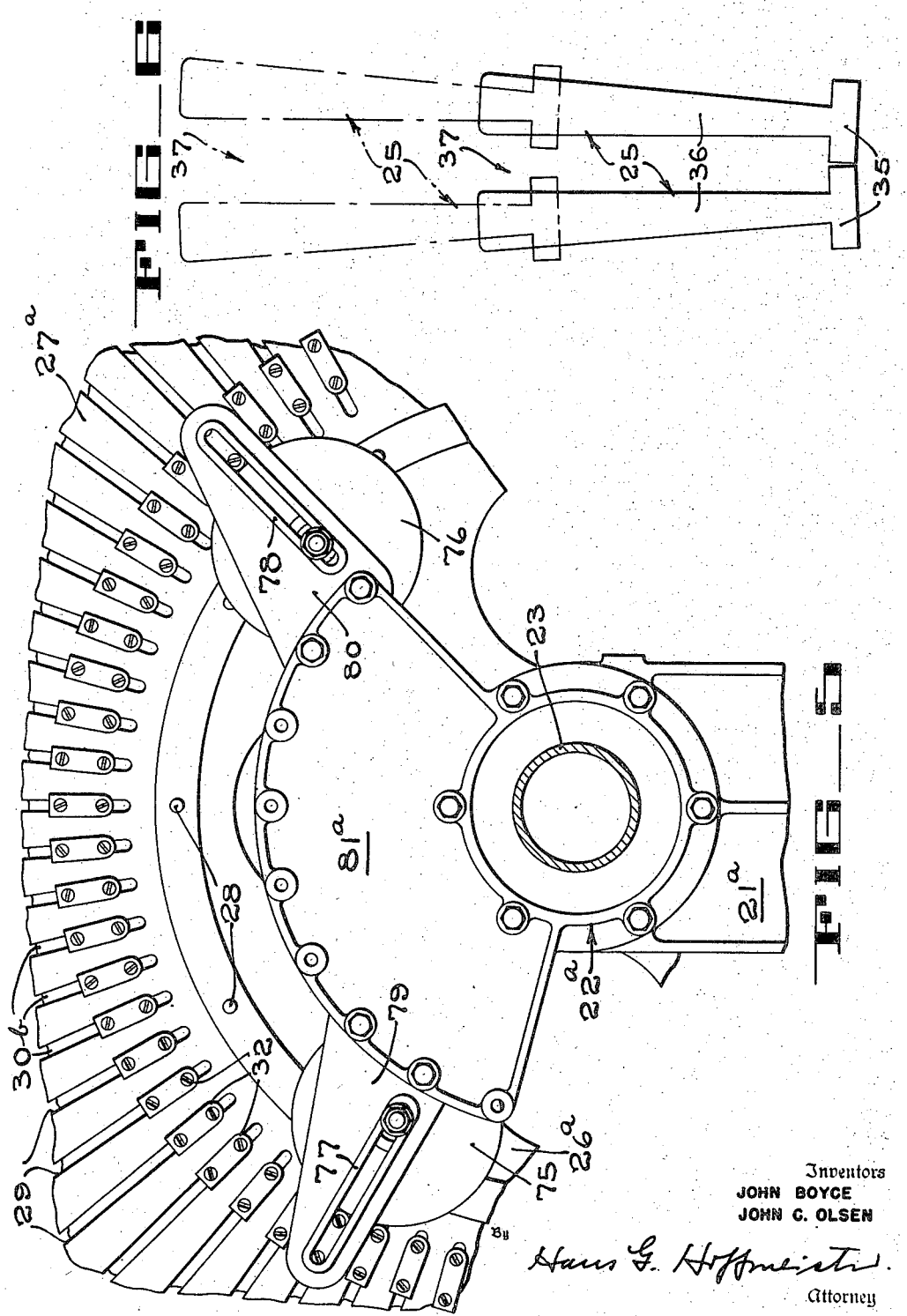

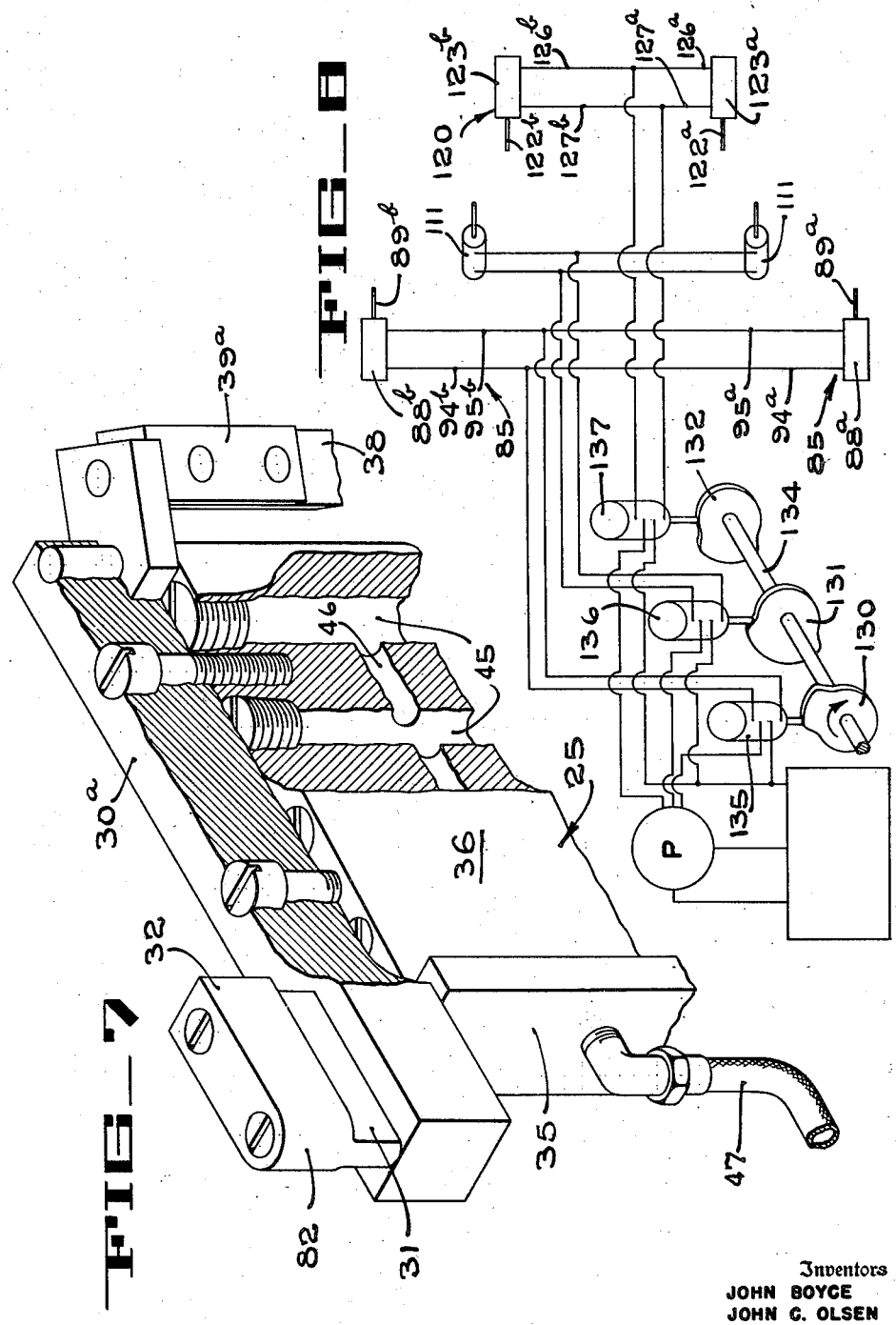

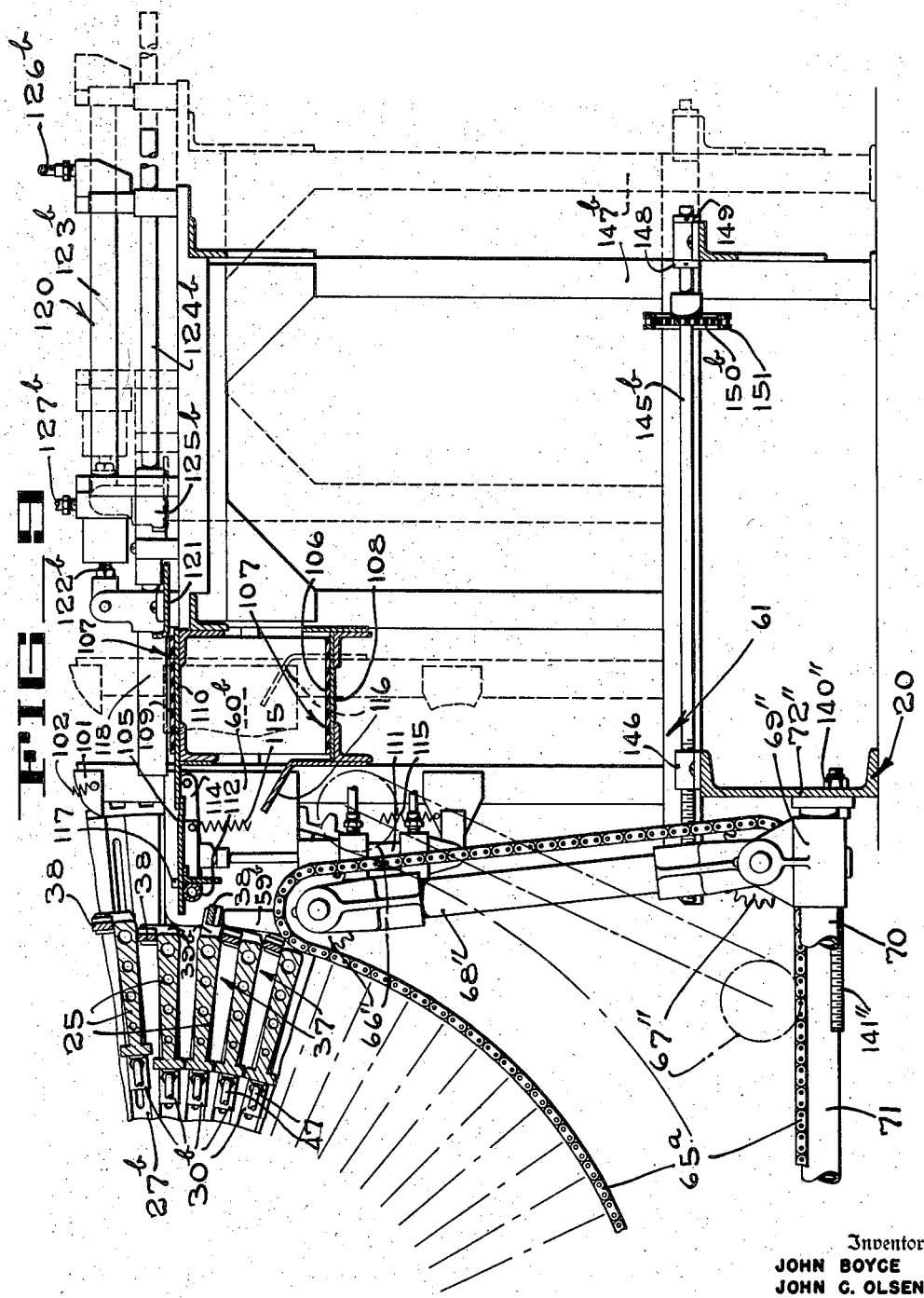

Feb. 12, 1957 J. BOYCE ET AL 2,780,927
CARTON FREEZING APPARATUS
Filed Aug. 8, 1952 9 Sheets-Sheet 9
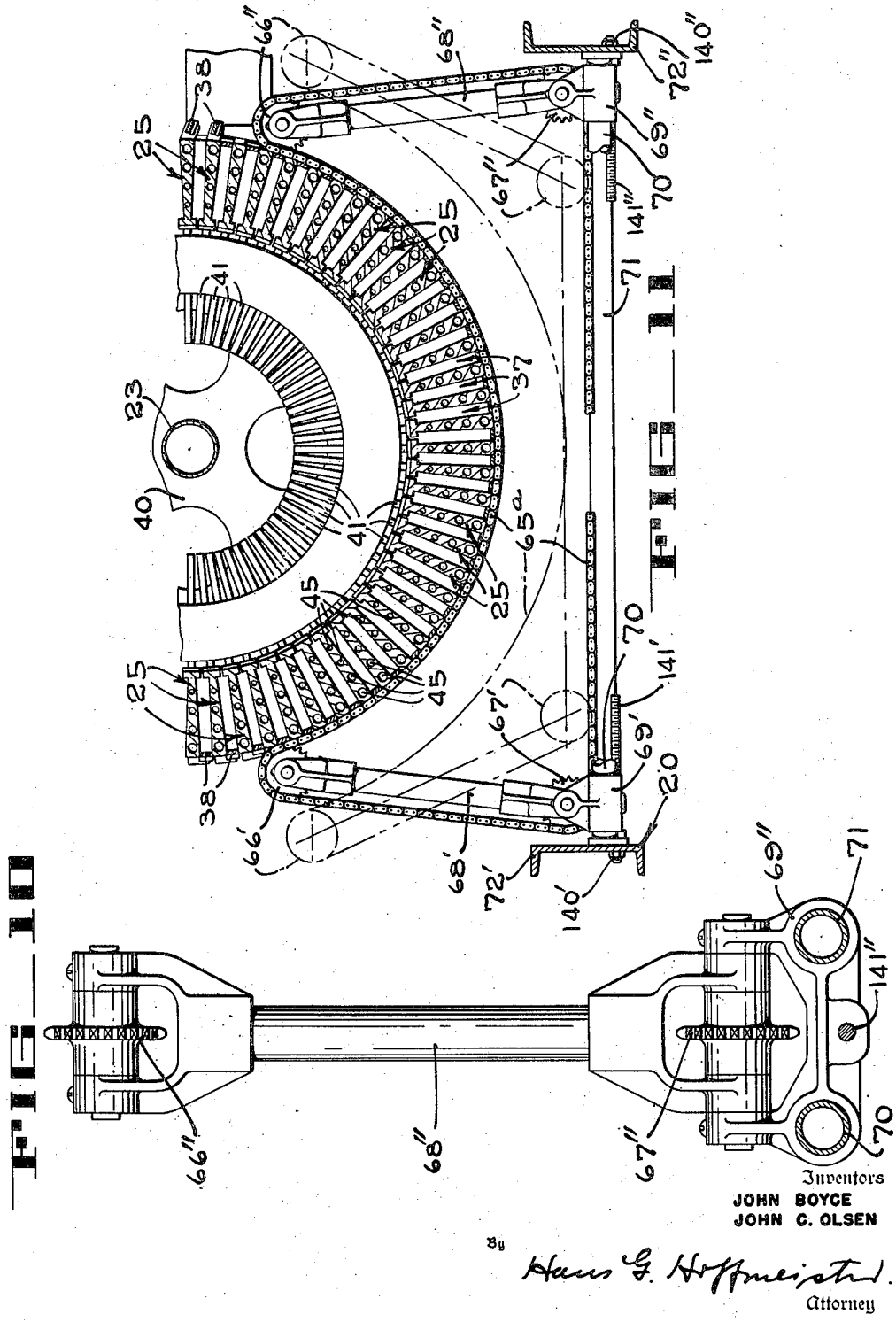
Inventors
JOHN BOYCE
JOHN C. OLSEN
By Hans G. Hoffmeister
Attorney

United States Patent Office 2,780,927
Patented Feb. 12, 1957

2,780,927

CARTON FREEZING APPARATUS

John Boyce, San Jose, Calif., and John C. Olsen, Bigfork, Mont., assignors to Food Machinery and Chemical Corporation, San Jose, Calif., a corporation of Delaware Application August 8, 1952, Serial No. 303,234

17 Claims. (Cl. 62—114)

The present invention relates to freezing apparatus for cartons containing food and the like, and more particularly to freezing apparatus of the type wherein the food containing cartons are held in heat conductive contact with refrigerated walls or shelves.

An object of the present invention is to provide a thermally efficient freezing apparatus, of the type referred to, that is capable of handling large quantities of cartons in a continuous process.

Another object is to provide an improved freezing apparatus, of the type referred to, which is adapted to receive a plurality of cartons or packages simultaneously.

A further object is to provide a continuous freezing apparatus in which the cartons are maintained in stationary and intimate contact with the refrigerating surfaces during the freezing process.

Another object is to provide a freezing apparatus having compartments which are substantially closed off from communication with the atmosphere during the freezing process.

A further object is to provide a freezing apparatus which may be utilized with cartons of various dimensions.

Another object is to provide a freezing apparatus that may readily be adjusted to accommodate cartons of various dimensions.

Yet a further object is to provide a contact-freezing apparatus, of the type referred to, which will automatically adjust the freezing compartments to accommodate the expansion of the cartons during the freezing operation.

Another object is to provide a continuous freezing apparatus incorporating an improved feed and discharge arrangement.

These and other objects will become apparent from the following description of the accompanying drawing in which:

Fig. 1 is an end elevation of the freezing apparatus of the present invention.

Fig. 2 is a fragmentary vertical section of the freezing apparatus taken on the line 2—2 of Fig. 1.

Figs. 3A and 3B are interrupted top plan views of a horizontal section through the freezing apparatus taken along line 3—3 of Fig. 1 and illustrating particularly the carton feed and discharge arrangement thereof.

Fig. 4 is a transverse vertical section through a portion of the freezing apparatus illustrating details of the carton feed and discharge arrangement thereof.

Fig. 5 is an enlarged end elevation of a portion of the freezing apparatus as viewed in Fig. 1 presenting more clearly details of the arrangement for automatically enlarging the size of the compartments of the freezing apparatus during its operation.

Fig. 6 is a somewhat diagrammatic illustration of the manner in which an individual compartment of the freezing apparatus may be adjusted in size.

Fig. 7 is a fragmentary isometric view of the end portion of one of the shelves that form the freezing compartments of the apparatus.

Fig. 8 is a diagram illustrating the manner in which the carton feed and discharge mechanisms are actuated.

Fig. 9 is a section taken on the line 9—9 of Fig. 2 showing further details of the carton feed and discharge arrangement.

Fig. 10 is an elevation of a sprocket member which constitutes an element of the freezing apparatus.

Fig. 11 is a fragmentary end elevation partly in section illustrating the adjustability of a pair of conjointly utilized sprocket members and a chain associated therewith.

With particular reference to Figs. 1 and 2, the freezing apparatus of the invention includes an elongated base 20 provided at either end with vertically rising pedestals 21a and 21b which mount at their upper ends journal boxes 22a and 22b, respectively, for rotatable suspension therebetween of a hollow shaft 23. A plurality of elongated heat-conductive metal shelves 25 are mounted in spaced circumferential relation about said shaft, producing a drum-like configuration. For the purpose of mounting the shelves in this manner, spoke wheels 26a and 26b are rigidly secured to the shaft 23 adjacent the journal boxes 22a and 22b, respectively. Annular plates 27a and 27b are secured to the spoke wheels 26a and 26b, respectively, by means of bolts 28, and each of said annular plates is provided with a large number of radially extending circumferentially spaced slots 29. Bars 30a and 30b, respectively, are bolted to the opposite ends of each shelf 25 and each of said bars is provided with a projecting shoulder 31 (Fig. 7) which slidingly engages a radial slot 29 in annular plate 27a or 27b, as the case may be, and has its protruding end extended into a retaining head 32 to prevent disengagement from said slot. In this manner, each shelf 25 is supported at its opposite ends from the annular plates 27a and 27b, respectively, in a position wherein its plane intersects the axis of the shaft 23 and wherein it may move radially relative to said shaft but is restrained against relative rotation thereabout. Each shelf 25 is roughly of a T-shaped cross section with the head 35 of the T presented to the shaft 23 (Fig. 4). The portions 36 of the shelves corresponding to the stem of the T extend radially away from said shaft and are of outwardly diverging contour, their divergence being of such degree that the confronting surfaces of adjacent shelves are substantially parallel. As a result thereof, any radial movement of two adjacent shelves within the slots 29 will not vary the parallel arrangement of their confronting surfaces in any manner but will change the actual distance therebetween as illustrated in Fig. 6 which shows in full lines a pair of adjacent shelves 25 in their position nearest to the axial shaft 23, with phantom lines indicating the position of the same pair of shelves after they have been radially withdrawn from said shaft 23. The spaces formed between the confronting surfaces of adjacent shelves 25 and the heads 35 of said shelves form the freezing compartments 37 of the apparatus. Flat bars 38 held between short arms 39a and 39b that are pivotally secured to, and project from, the outer ends of the mounting bars 30a and 30b, respectively, at the opposite ends of each shelf, form gates adapted to pivot into a position wherein they close the outer sides of the compartments 37 (Figs. 4 and 7).

Since the shelves 25 are of extended length there is a tendency for sagging when said shelves are disposed in the horizontal plane which intersects the shaft 23. Accordingly, a circular plate 40 is secured to the shaft 23 substantially at its mid point as shown in Fig. 2, and rods 41 rigidly secured to the inner edges of the shelves 25 are slidably received in respective ones of a plurality of radial bores 42 formed in the circumference of plate 40 (Fig. 3B) to provide a positive support against sagging of the shelves.

The shelves 25 contain a plurality of longitudinal channels 45 which are inter-connected by radial channels 46 and a liquid refrigerant is delivered into said radial channels through the heads 35 of the shelves by way of conduits 47 (Fig. 7) that are connected to an annular manifold 48 (Fig. 2) which is in turn in communication with a chamber 49 formed in the hollow interior of the rotatable shaft 23. A source of liquid refrigerant (not shown) may be connected to said chamber 49 in any suitable manner. The refrigerant is discharged from the channels 45 and 46 by means of other conduits 50 (Fig. 2) that lead into a second annular manifold 51 mounted upon the shaft 23 and connected to another chamber 52 formed in the hollow interior of the rotatable shaft and separated from the first mentioned chamber by suitable blocking means 53 and 54.

For the purpose of imparting rotary movement to the shaft 23 and the shelves 25 disposed thereabout, the periphery of each annular plate 27a and 27b is formed with gear teeth 55 (Figs. 2 and 4) which engage a suitable drive means preferably of the intermittent type, such as the Geneva drive mechanism indicated generally by the numeral 56 in Figs. 1 and 2 which is connected through a gear reducer 57 to an electric motor 58 mounted upon the base 20. The drive arrangement may be such that each driving impulse will move the shelves a distance equivalent to the thickness of one shelf plus the distance between adjacent shelves. Accordingly, after each driving impulse, any given shelf will occupy precisely that position occupied by the preceding shelf prior to the impulse.

The cartons are inserted into the compartments 37 of the described apparatus adjacent the shelves occupying the three o'clock position as viewed in Fig. 1. In the particular embodiment of the invention illustrated in the accompanying drawings, the rotation of the freezing apparatus occurs in a clockwise direction as viewed in Fig. 1 and as a compartment 37 moves into the above defined three o'clock position, its outer wall as formed by the pivoting gate bar 38 swings into open position under the force of gravity (Fig. 4) permitting insertion of cartons into the compartment. Immediately subsequent to the insertion of cartons into the freezing compartment, means enter into operation that swing the bar 38 into compartment-closing position. For this purpose, two camming members 59 (only one being visible in Fig. 4) are welded to plates 60a and 60b, respectively, that are supported in longitudinally spaced relation from a frame structure 61 which is arranged adjacent to but is distinct from the base 20. Said camming members 59 are arranged to engage the gate bars 38 and pivot the same against the force of gravity into compartment-closing position. Each gate bar 38 is maintained in such closed position through the lower semi-circle of rotation of the rotary freezer by chains 65a and 65b arranged at the opposite ends of said bars. At the opposite sides of the rotating drum formed by the shelves 25 each of the chains 65a and 65b is trained around upper sprockets 66' and 66" and lower sprockets 67' and 67" (Fig. 11) and each two vertically superposed sprockets 66' and 67' and 66" and 67" are adjustably mounted upon the opposite ends of an arm 68' and 68", respectively (Fig. 10). At their lower ends said arms are pivotally supported in carriages 69' and 69"', respectively, that slidably engage two horizontally extending parallel guide rods 70 and 71, supported in two longitudinally extending channels 72' and 72" that form part of the machine base 20. The chains 65a and 65b are also effective to prevent outward radial movement of the shelves during the lower semi-circle of rotation of the machine and hence maintain the intimate contact between the refrigerating surfaces and the processed cartons that is requisite for effective heat transfer.

As rotation of the freezer continues and the freezing operation proceeds, expansion of the cartons occurs. To accommodate such expansion and thus avoid crushing of the carton, or stressing of the shelf structure, two circular cams 75 and 76 are adjustably mounted in slots 77 and 78, respectively, that are formed in support members 79 and 80 arranged at either end of the apparatus (Fig. 5). Said support members are secured to a circumferentially adjustable disc segment 81a or 81b which is supported from the pedestals 21a and 12b, respectively, above the shaft 23 (Figs. 1 and 5). Each of the cams 75 and 76 is arranged to engage the rounded inner ends 82 of the shoulders 31 (Fig. 7) projecting from the shelf support bars 30a and 30b through the slots 29 in the annular plates 27a and 27b, respectively, to push each shelf 25 radially outwards as it passes said cams which is effective to increase the spacing between adjacent shelves 25. The circular cams 75 and 76 are mounted in angularly spaced relation on the disc segments 81a and 81b, respectively, with the second cam 76 (in the direction of rotation of the shelves) adjusted to impart a greater outward thrust to the shelves 25 than the first cams 75 so that two distinct and successive camming actions are performed during rotation of the shelf freezer to increase the width of the freezing compartments 37 successively to greater degrees.

The speed of the rotary freezer is such that one revolution thereof is adequate to provide complete freezing of the series of cartons or packages disposed between any two shelves. As a certain shelf 25 completes a revolution to be disposed substantially in a horizontal plane in the previously described three o'clock position, an ejector mechanism 85 engages the shoulders 31 of the support bars 30a and 30b at either end of the shelf to push the shelf outwardly into the projected position shown in Fig. 4. As seen more clearly in Figs. 3A and 3B, the shelf ejector mechanism 85 comprises two horizontal carriage rods 86a and 86b which are suitably supported adjacent the opposite ends of the freezing apparatus between angle irons 87a or 87b rising from the base 20 and the upper ends of the vertical pedestals 21a and 21b, respectively. Hydraulic cylinders 88a and 88b are suitably mounted on the rods 86a and 86b in a position parallel and adjacent thereto and enclose hydraulic pistons having piston rods 89a and 89b, respectively. Sleeves 90a and 90b slidably embrace the carriage rods 86a and 86b and possess laterally projecting lips 91a and 91b that are suitably connected to the piston rods 89a and 89b by means of opposed nuts 92; and ears 93a and 93b on the sleeves 90a and 90b, respectively, are arranged to engage the shoulders 31 of the shelf support bars 30a and 30b at the opposite ends of the shelves 25.

Accordingly, when hydraulic fluid is supplied through conduits 94a and 94b into the cylinders 88a and 88b, respectively, and the piston rods 89a and 89b are projected therefrom, the ears 93a and 93b on the sleeves 90a and 90b push outwardly whatever shelf is at the moment positioned with the shoulders 31 of its mounting bars 30a, 30b before said ears. Such a projected shelf is illustrated in Figs. 3A and 3B in phantom lines. Subsequent supply of fluid into the cylinders 88a and 88b through other conduits 95a and 95b, respectively, retracts the ejector mechanism 85 but leaves the ejected shelf in its extended position.

When a shelf 25 is projected as described, the packages in the compartment above said shelf are positively moved outwardly with the shelf since they are engaged by the head portion 35 of the T. Consequently, any tendency for the packages to stick to the surface of the shelf forming the roof of the compartment will be overcome. To prevent the cartons on the ejected shelf from sliding off and dropping from the shelf as said shelf is moved outwardly in the described manner, two fingers 100 are pivotally mounted on plates 101 that are supported from the hereinbefore described frame 61 above the carton ejection position (Fig. 4). Springs 102 urge said fingers to maintain the hereinbefore described gate bar 38 on the ejected shelf in compartment-closing position, and shoulders 103 on the plates 101 are arranged to maintain each gate bar 38 closed as it approaches the discharge position.

The described outwardly directed movement of a particular shelf is also effective to cause outward movement of the packages disposed thereunder, and since the gate bar 38 is pivoted to the directly preceding (and consequently next lower) shelf is now no longer restrained by the fingers 100, said packages force it open and drop across a bridge 105 onto the lower run 106 of an endless conveyor belt 107. As seen in Figs. 3A and 3B said belt 107 extends adjacent the freezing apparatus throughout its entire length and is arranged to transfer the frozen packages to a repository (not shown). Said belt may be rotatably supported and driven in any suitable manner, and its lower run may be arranged to rest on a horizontal belt table 108 secured to the frame 61, while its upper run 109 rests on another belt table 110 directly above the discharge run 106 and serves to deliver cartons to the freezing compartments of the described apparatus.

The bridge 105 is also of a length commensurate with the freezing apparatus and is arranged to alternately serve as a ramp for feeding cartons into the apparatus, and as a slide for conducting discharged cartons from the apparatus to the discharge run 106 of the conveyor 107. For this purpose hydraulic cylinders 111 similar to those of the ejector mechanism 85 described above, are mounted on the frame 61 adjacent each end thereof to extend upwardly, and the upper ends of their plungers 111′ are pivotally connected to the bridge 105 which in turn is pivotally mounted on a rod 112 supported between a pair of links 114 that are pivotally secured to the previously described end plates 60a and 60b (Figs. 3A, 3B and 4).

When the plungers 111 are retracted and the bridge 105 is lowered, said bridge permits discharge of packages from an adjacent freezing compartment 37 thereacross to the lower run 106 of the belt 107, as previously described. Springs 115 hold the bridge 105 yieldably in its lowered position against an underlying slanting plate 116 secured to the frame 61 adjacent the lower run 106 of the belt 107. Upon hydraulic actuation of the plungers 111′, the bridge 105 is swung upwardly until it engages stops 117 on the end plates 60a and 60b whereby it is positioned in aligned relationship with the upper belt table 110, and thus forms a continuous path between the upper run 109 of the belt and whatever shelf 25 may at the moment be positioned at the same level as said upper belt run.

The upper run 109 of belt 107 is adapted to carry a sequence of packages into injecting position where they will be restrained against further movement by means of a stop plate 118 suitably supported above the upper belt run from the frame structure 61 (Fig. 3A).

After the bridge plungers 111′ are actuated to move the bridge 105 upwardly into alignment with the upper belt table 110, an injector mechanism 120 is actuated to insert the unfrozen packages which have accumulated on the upper run 109 of the belt into the compartment just vacated.

The injector mechanism 120 comprises an elongated pusher bar 121 which extends parallel to the upper run 109 of the belt 107 and which is suitably supported from piston rods 122a and 122b which project horizontally from hydraulic cylinders 123a and 123b, respectively. Carriage rods 124a and 124b secured to the pusher bar 121 are slidably received within sleeves 125a and 125b which are rigidly secured to the frame structure 61 and which in turn support the cylinders 123a and 123b. Upon actuation of the piston rods 122a and 122b by the application of hydraulic pressure thereto through conduits 126a and 126b, respectively, the pusher bar 121 moves across the upper run 109 of the belt 107. Accordingly, any packages positioned on the belt will be moved laterally from the belt surface into the aligned compartment 37 of the freezing apparatus. Fluid subsequently supplied to the cylinders 123a and 123b through conduits 127a and 127b, respectively, retracts the pusher bar 121.

The package injection causes engagement of the unfrozen packages with the head 35 of the outwardly projected T-shaped shelf 25, which is effective to return said shelf to its normal position. At this point another driving impulse is imparted to the rotary freezer after which the series of operations just described is repeated.

It will be noted that the injection of the unfrozen packages into a vacated compartment 37 occurs while one of its adjacent shelves is in extended position whereby the thickness of the compartment to be supplied is substantially increased, thus enabling an easy, trouble-free insertion of the packages. However, the insertion of the cartons pushes the projected shelf inwardly which action causes a decrease in the compartment thickness. When fully inserted, the cartons are embraced tightly by the opposed shelves to thereby insure efficient heat transfer.

As shown in Fig. 8, the proper timing of the various hydraulic plungers is obtained through the utilization of cams 130, 131, 132 mounted on a shaft 134 connected by a suitable train of gears (not shown) to the shaft for the Geneva drive 56. Each cam is adapted to open a valve to supply hydraulic fluid under pressure from a pump P to the proper cylinder. During a normal operational cycle, as the shaft 134 rotates in clockwise direction as viewed in Fig. 8, cam 130 first connects the pump P to the ejector cylinders 88a, 88b through valve 135 and conduits 94a, 94b to thus project one shelf 25 outwardly. This outward movement of said shelf has a two-fold effect, (1) it is effective to detach the packages resting thereon from the shelf above and (2) it ejects the packages in the compartment below the projected shelf across the bridge 105 onto the lower run 106 of the belt 107. The second cam 131 then opens a valve 136 to actuate the plungers 111′ which raise the bridge 105 to the level of the upper run 109 of the belt 107, whereupon the third cam 132 opens a valve 137 to actuate the injector mechanism 120 causing it to inject a new supply of packages into the compartment just vacated, i. e., the compartment below the projected shelf. When the new supply of packages is injected into said compartment, said packages strike against the downwardly directed leg of the cross head 35 of the projected shelf, which is effective to return said shelf with the previously frozen cartons still resting thereon to its normal retracted position, said previously frozen cartons being now loosened from the shelf above. The timing of the cam arrangement is such that the injector mechanism 120 is not actuated until the first cam 130 has rotated sufficiently far to close conduits 94a, 94b and open conduits 95a, 95b to retract the ejector mechanism 85, which latter actions occur when the stem of valve 135 moves downwardly. The bridge plungers 111′ on the other hand are not retracted until the injector mechanism 120 is retracted to thus preclude improper feeding.

After a new supply of packages has been delivered into the compartment below the projected shelf and said shelf has thereby been returned to its initial retracted position, as explained above, the Geneva drive mechanism turns to move the directly succeeding shelf into alignment with the shelf ejector mechanism 85 which enters into operation to project said shelf in the previously described manner, and thus discharge the packages in the compartment below which rest upon the previously projected shelf.

The freezer compartments are adapted to receive packages of different length, width, and depth. Obviously, to accommodate packages of a different length it is only necessary to vary the number of packages fed to the belt 107. It will be similarly obvious that thhe apparatus of the invention is capable of accommodating packages of any width which does not exceed the radial dimension of the shelves, if the initial position of the injector cylinders is appropriately adjusted.

In order to accommodate packages of varying thickness, the radial positioning of the shelves 25 has to be changed.

Accordingly, it is first necessary to vary the position of the previously mentioned support chains 65a and 65b. If it is desired to move the shelves 25 radially outwards to thus increase the distance between respective shelves, it is merely necessary to rotate nuts 140' and 140" welded to threaded bolts 141' and 141", respectively, which are rotatably mounted in, but are restrained against axial movement relative to the longitudinal channels 72' and 72" of the machine base 20 (Fig. 11). Said bolts are threadedly received in bores provided in the carriages 69' and 69", respectively (Fig. 10). Thus, by turning the nuts 140' and 140" in an appropriate direction, the carriages 69' and 69" may be moved closer to each other which withdraws the chains from the shaft 23 to the position indicated in phantom lines in Fig. 11 permitting a corresponding outward movement of the shelves 25. As a next step, the hereinbefore described circular cams 75, 76 are also adjusted outwardly within the slots 77 and 78, respectively, to provide for successive expansion of the larger size packages. The nuts 92 on the ejector piston rods 89a and 89b are then turned to adjust the radial position of the sleeves 90a and 90b, respectively, whereby the stroke of the shelf ejector is radially transferred to the desired degree.

Since the shelves 25 are moved outwardly, it is also necessary to displace the frame 61 supporting the belt 107, the bridge element 105 and the injector mechanism 120, a commensurate distance to the right into the position illustrated in phantom lines in Fig. 9. For this purpose, the ends of a pair of horizontally extending parallel rods 145a and 145b are received in threaded sleeves 146 that are affixed to the right hand channel 72" of machine base 20. The opposite ends of said rods are rotatably supported from the legs 147a and 147b of the frame 61 but are restrained from axial movement relative to said legs by suitable set collars 148 and 149. Both the rods 145a and 145b are operatively connected for rotation in unison by sprockets 150a and 150b and a sprocket chain 151, and the outwardly projecting end of the foremost rod 145a is provided with a crank handle 152 (Fig. 1). Whenever the crank handle 152 is turned, both said rods 145a and 145b turn in unison which causes them to move relative to the threaded sleeves 146a and 146b on the base 20 either toward or away from said base depending upon the direction in which the crank handle 152 is turned; and when said rods 145a and 145b move in the defined manner, they take along the frame 61. A pointer 153 may be rigidly mounted upon the rod 145a to indicate the degree of lateral displacement of the frame 61 upon a scale 154 that is suitably supported from the channel 72" of the machine base.

While we have illustrated and described a preferred embodiment of the present invention, it will be understood, however, that various changes and modifications may be made in the details thereof without departing from the spirit and scope of the invention as set forth in the appended claims.

Having thus described the invention what we claim and desire to protect by Letters Patent is as follows:

1. In a freezing apparatus, a carton supporting arrangement comprising a pair of shelves disposed radially relative to and rotatable about a common axis and spaced circumferentially to define a freezing compartment corresponding in height to the distance between proximate faces of the shelves, means mounting said shelves for radial movement toward and away from said axis whereby the height of said compartment may be varied, and means for moving said shelves away from said axis in successive steps for increasing successively the height of said compartment to accommodate the expansion of a carton carried therein during the freezing operation.

2. Carton supporting arrangement comprising a horizontally disposed rotatable shaft, a plurality of shelves rotatable with and circumferentially spaced around said shaft to form a plurality of compartments, closure members for said compartments pivotally mounted adjacent the outer extremities of said shelves, means mounting said shelves for radial sliding movement with respect to said shaft, and means for supporting those of said shelves disposed downwardly of said shaft against outward radial movement and adapted to hold said pivoted closure members in compartment closing position.

3. Carton supporting arrangement comprising a horizontally disposed rotatable shaft, a plurality of shelves disposed radially in circumferentially spaced relation around said shaft and being rotatable therewith, means mounting said shelves for radial sliding movement with respect to said shaft, and means including an endless chain to support those of said shelves disposed downwardly of said shaft and limit their outward radial movement.

4. Carton supporting arrangement comprising a horizontally disposed rotatable shaft, a plurality of shelves disposed radially and in circumferentially spaced relation around said shaft and being rotatable therewith, means mounting said shelves for radial sliding movement with respect to said shaft, means including freely rotatable sprockets mounted adjacent those of said shelves disposed downwardly of said shaft and an endless chain trained around said sprocket to support said downwardly disposed shelves and limit their outward radial movement, and means for adjusting the position of said sprockets.

5. A rotary conveyor construction for freezing apparatus, comprising a rotatable shaft, means for rotating the shaft, a plurality of refrigerant conducting shelves disposed radially and in circumferentially spaced relation around said shaft to form a plurality of freezing compartments for filled cartons, said shelves being rotatable with said shaft, means mounting said shelves for radial movement with respect to said shaft, means for introducing articles to be frozen into each compartment when the compartment occupies a predetermined position within its orbit, cam means disposed approximately at an opposite position within said orbit adapted to engage said shelves during their rotation to displace said shelves radially outwards to thereby increase the spacing therebetween and thus accommodate the increase in size of the cartons during the freezing operation, and means for adjusting said cam means whereby the radial displacement of said shelves may be varied.

6. In a carton handling apparatus, a pair of shelves disposed radially relative to a common axis and spaced circumferentially from each other, said shelves being adapted to form therebetween a compartment for the reception of cartons, means mounting said shelves for radial sliding movement whereby the spacing between said shelves is made variable, means effective to radially displace one of said shelves relative to the other to thereby increase the spacing between said shelves and an abutment on one of said shelves engageable with cartons within the compartment to discharge the cartons from said compartment when said one of the shelves moves radially.

7. In a carton handling apparatus, a plurality of shelves disposed radially relative to a common axis and circumferentially spaced from each other to form therebetween compartments for the reception of cartons, means mounting said shelves for radial sliding movement whereby the spacing between adjacent shelves may be varied, means for effecting movement of said compartments about said axis successively to a discharge station wherein said shelves assume a substantially horizontal position, means operable at said station for radially displacing said shelves when in said horizontal position relative to adjacent shelves, and an abutment on one of said shelves engageable with cartons within one of the compartments to discharge cartons from said one of the compartments when one of the shelves associated with the compartment moves radially.

8. In carton handling apparatus, a bridge adapted to convey articles, means supporting the bridge for communication between two operating positions, means interconnecting the bridge and the supporting means and yieldably holding said bridge in one of said positions, means mounted on said bridge supporting means for moving said bridge to its other position, means mounted on said bridge supporting means and operable to propel articles across the bridge in one direction, means mounted on said bridge supporting means and operable to propel articles across the bridge in the opposite direction, and means operably connected to said first mentioned propelling means, said bridge moving means and said second mentioned propelling means for successively actuating the same in the recited order.

9. A carton freezing apparatus comprising a plurality of shelves disposed radially and in circumferentially spaced relation about a common axis to form therebetween freezing compartments for the reception of cartons, means mounting said shelves for radial sliding movement whereby the spacing between adjacent shelves may be varied, means for moving said shelves successively about said axis past a feed position, means operable at said feed position for radially displacing one of said shelves relative to the others to increase the depth of the adjoining compartments, means for injecting cartons into one of the compartments adjoining said displaced shelf, and an abutment on said one of the shelves engageable by a carton entering the associated compartment to return said shelf to its original position.

10. A carton freezing apparatus comprising a pair of shelves disposed radially relative to a common axis and spaced circumferentially from each other to form therebetween a freezing compartment for the reception of cartons, means mounting one of said shelves for radial sliding movement whereby the spacing between said shelves is made variable, means for radially displacing one of said shelves relative to the other to thereby increase the spacing between said shelves and to discharge cartons from said compartment, means for injecting cartons into said compartment, and an abutment on said one of the shelves engageable by a carton entering the associated compartment to return the displaced shelf to its original position.

11. A carton freezing apparatus comprising a plurality of shelves disposed radially relative to a common axis and spaced circumferentially to form therebetween freezing compartments for the reception of cartons, means mounting said shelves for radial sliding movement whereby the spacing between said shelves is made variable, means for moving said shelves about said axis successively past a position of discharge, means operable at said position for radially displacing one of said shelves relative to the others to thereby simultaneously increase the depth of the adjoining compartments and eject cartons from an adjoining one of said compartments, means for injecting cartons into said adjoining compartment, and an abutment on said one of the shelves engageable by a carton entering the associated compartment to return said shelf to its original position, and means for actuating said shelf displacing means and said carton injecting means in succession.

12. A conveyor construction for freezing apparatus comprising a rotatably mounted shaft, a plurality of shelves carried thereby and disposed radially with respect thereto in angularly spaced apart relation to each other to define freezing compartments between the shelves, means for imparting rotary movement to said compartments, closure members for the compartments mounted on said shelves adjacent the outer edges thereof for movement between compartment closing and compartment opening positions, and means operative as each compartment departs from a predetermined position for moving the associated closure member to its compartment closing position.

13. A conveyor construction for freezing apparatus comprising a rotatably mounted shaft, a plurality of shelves carried thereby and disposed radially with respect thereto in angularly spaced apart relation to each other to define freezing compartments between the shelves, and closure members for the compartments carried by said shaft and mounted adjacent the outer edges of the shelves for movement between compartment closing and compartment opening positions, each of said closure members being movable by gravity to its compartment opening position as its associated compartment approaches a predetermined position.

14. In freezing apparatus, a rotary conveyor comprising a plurality of shelves arranged radially in a pattern of circular cross section and angularly spaced from each other to present freezing compartments between the shelves, means mounting said shelves for rotary motion, a closure member for each of said compartments carried by said mounting means and mounted for pivotal movement between a position closing the associated compartment and a position removed from said compartment, and means operative as each compartment departs from a predetermined station in the circular path of the compartment for moving the associated closure member to its compartment closing position.

15. A conveyor construction for freezing apparatus comprising a rotatably mounted shaft, a plurality of shelves carried thereby and disposed radially with respect thereto in angularly spaced apart relation to each other to define freezing compartments between the shelves, closure members for the compartments carried by said shaft and mounted adjacent the outer edges of the shelves for movement between compartment closing and compartment opening positions, means defining a compartment unloading and loading station substantially in horizontal alignment with said shaft and adjacent the path of the shelves, each of said closure members being movable to its compartment opening position as the associated compartment approaches said station, and means operative as each compartment departs from said station for moving the associated closure member to its compartment closing position.

16. A conveyor construction for freezing apparatus comprising a rotatably mounted shaft, a plurality of shelves carried thereby and disposed radially with respect thereto in angularly spaced apart relation to each other to define freezing compartments between the shelves, closure members for the compartments carried by said shaft and mounted adjacent the outer edges of the shelves for movement between compartment closing and compartment opening positions, means defining a compartment unloading and loading station substantially in horizontal alignment with said shaft and adjacent the path of the shelves, each of said closure members being movable to its compartment opening position as the associated compartment approaches said station, means operative as each compartment departs from said station for moving the associated closure member to its compartment closing position, and a flexible member suspended from positions spaced circumferentially of the circular path of the shelves and engaging said closure members to retain in their respective compartment closing positions the closure members of compartments in the lower semi-circle of rotation thereof.

17. A conveyor construction for freezing apparatus comprising a rotatably mounted shaft, a plurality of shelves carried thereby and disposed radially with respect thereto in angularly spaced apart relation to each other to define freezing compartments between the shelves, closure members for the compartments carried by said shaft and mounted adjacent the outer edges of the shelves for movement between compartment closing and compartment opening positions, means defining a compartment unloading and loading station substantially in horizontal alignment with said shaft and adjacent the path of the shelves, each of said closure members being movable to its compartment opening position as the associated compartment approaches said station, means operative as each compartment departs from said station for moving the associated closure member to its compartment closing positions, and a flexible member movable with and maintaining in their respective compartment closing positions the closure members of compartments in the lower semi-circle of rotation thereof.

References Cited in the file of this patent

UNITED STATES PATENTS

| | | |
|---|---|---|
| 1,084,835 | Antrim | Jan. 29, 1914 |
| 1,093,815 | Whittier | Apr. 21, 1914 |
| 1,621,301 | Wright | Mar. 15, 1927 |
| 1,999,596 | Roemer | Apr. 30, 1935 |
| 2,215,486 | Stone | Sept. 29, 1940 |
| 2,307,548 | Stone | Jan. 5, 1943 |
| 2,332,170 | Sapp | Oct. 19, 1943 |
| 2,478,465 | Dodson | Aug. 9, 1949 |
| 2,538,097 | Henderson | Jan. 16, 1951 |
| 2,564,056 | Fahey | Aug. 14, 1951 |
| 2,605,912 | Small et al. | Aug. 5, 1952 |
| 2,612,278 | McGuire | Sept. 30, 1952 |

FOREIGN PATENTS

| | | |
|---|---|---|
| 327,366 | Great Britain | Apr. 3, 1930 |